(12) United States Patent
Bour et al.

(10) Patent No.: US 8,522,872 B2
(45) Date of Patent: Sep. 3, 2013

(54) IN SITU DECOMPOSITION OF CARBONYLS AT HIGH TEMPERATURE FOR FIXING INCOMPLETE AND FAILED WELL SEALS

(75) Inventors: Daniel L. Bour, Granite Falls, WA (US); Peter E. Rose, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 383 days.

(21) Appl. No.: 12/903,969

(22) Filed: Oct. 13, 2010

(65) Prior Publication Data

US 2011/0067869 A1    Mar. 24, 2011

Related U.S. Application Data

(60) Provisional application No. 61/251,513, filed on Oct. 14, 2009.

(51) Int. Cl.
 *E21B 33/13* (2006.01)
 *E21B 33/138* (2006.01)
 *C09K 8/86* (2006.01)

(52) U.S. Cl.
 USPC ........... 166/277; 166/288; 166/292; 166/294; 166/300; 166/302; 507/244; 507/267; 507/268; 507/277

(58) Field of Classification Search
 None
 See application file for complete search history.

(56) References Cited

U.S. PATENT DOCUMENTS

| | | | |
|---|---|---|---|
| 3,195,630 A | 7/1965 | Fisher | |
| 3,390,723 A | 7/1968 | Hower et al. | |
| 3,526,097 A | 9/1970 | Nelson | |
| 3,942,101 A | 3/1976 | Saye et al. | |
| 3,960,736 A | 6/1976 | Free et al. | |
| 4,055,399 A | 10/1977 | Parrish | |
| 4,126,406 A | 11/1978 | Traylor et al. | |
| 4,223,729 A | 9/1980 | Foster | |
| 4,520,666 A | 6/1985 | Coblentz et al. | |
| 4,559,818 A | 12/1985 | Tsang et al. | |
| 4,573,537 A | 3/1986 | Hirasuna | |
| 4,577,679 A | 3/1986 | Hibshman | |
| 4,716,964 A | 1/1988 | Erbstoesser et al. | |
| 4,749,035 A | 6/1988 | Cassity | |
| 4,832,121 A | 5/1989 | Anderson | |
| 4,926,949 A | 5/1990 | Forrest | |

(Continued)

FOREIGN PATENT DOCUMENTS

DE    3925337 A1    2/1991
EP    0338154 A1    10/1989

(Continued)

OTHER PUBLICATIONS

PCT/US2010/052565—Search Report, Dec. 2, 2010.

(Continued)

*Primary Examiner* — George Suchfield

(74) *Attorney, Agent, or Firm* — King & Spalding LLP; Sanjeet Dutta

(57) ABSTRACT

Methods and systems relating to in situ decomposition of carbonyls at high temperature for fixing incomplete and failed well seals, are described. According to one embodiment, a method, comprises injecting a sealing agent into a subterranean well having sealing channels or voids in well casings. An alkaline-earth carbonate precipitate is formed from the decomposition of a carbonyl compound. The sealing agent includes the carbonyl compound and an alkaline-earth halide salt.

19 Claims, 3 Drawing Sheets

(56) References Cited

U.S. PATENT DOCUMENTS

| | | | |
|---|---|---|---|
| 4,976,142 A | 12/1990 | Perales | |
| 5,143,155 A | 9/1992 | Ferris et al. | |
| 5,163,321 A | 11/1992 | Perales | |
| 5,165,235 A | 11/1992 | Nitschke | |
| 5,168,928 A * | 12/1992 | Terry et al. | 166/300 |
| 5,246,860 A | 9/1993 | Hutchins et al. | |
| 5,515,679 A | 5/1996 | Shulman | |
| 5,595,245 A | 1/1997 | Scott, III | |
| 5,723,781 A | 3/1998 | Pruett et al. | |
| 5,890,536 A | 4/1999 | Nierode et al. | |
| 5,931,000 A | 8/1999 | Turner et al. | |
| 5,944,446 A | 8/1999 | Hocking | |
| 6,016,191 A | 1/2000 | Ramos et al. | |
| 6,125,934 A | 10/2000 | Lenn et al. | |
| 6,291,404 B2 | 9/2001 | House | |
| 6,401,819 B1 * | 6/2002 | Harris et al. | 166/300 |
| 6,543,538 B2 | 4/2003 | Tolman et al. | |
| 6,659,175 B2 | 12/2003 | Malone | |
| 6,758,271 B1 | 7/2004 | Smith | |
| 7,032,662 B2 | 4/2006 | Malone et al. | |
| 7,207,389 B2 | 4/2007 | Foster et al. | |
| 7,265,079 B2 | 9/2007 | Willberg et al. | |
| 7,296,625 B2 | 11/2007 | East, Jr. | |
| 7,299,873 B2 | 11/2007 | Hartman et al. | |
| 7,347,260 B2 | 3/2008 | Ferguson et al. | |
| 7,431,086 B2 * | 10/2008 | Lewis et al. | 166/293 |
| 7,523,024 B2 | 4/2009 | Endres et al. | |
| 7,565,929 B2 | 7/2009 | Bustos et al. | |
| 7,654,326 B1 | 2/2010 | Santra et al. | |
| 8,091,639 B2 * | 1/2012 | Rose et al. | 166/281 |
| 2003/0079877 A1 | 5/2003 | Wellington et al. | |
| 2004/0074642 A1 | 4/2004 | Price-Smith et al. | |
| 2005/0159319 A1 | 7/2005 | Eoff et al. | |
| 2005/0241828 A1 | 11/2005 | Almond et al. | |
| 2006/0113077 A1 | 6/2006 | Willberg et al. | |
| 2007/0042914 A1 | 2/2007 | Robertson et al. | |
| 2007/0083331 A1 | 4/2007 | Craig et al. | |
| 2007/0204990 A1 | 9/2007 | Kotlar et al. | |
| 2007/0223999 A1 | 9/2007 | Curlett | |
| 2007/0254814 A1 * | 11/2007 | Kotlar | 507/233 |
| 2007/0272407 A1 | 11/2007 | Lehman et al. | |
| 2008/0026956 A1 | 1/2008 | Shinbach et al. | |
| 2008/0083536 A1 | 4/2008 | Cavender et al. | |
| 2008/0108519 A1 * | 5/2008 | Harris et al. | 507/103 |
| 2008/0128108 A1 | 6/2008 | Clark | |
| 2008/0171674 A1 | 7/2008 | Lewis et al. | |
| 2008/0210423 A1 | 9/2008 | Boney | |
| 2008/0236823 A1 | 10/2008 | Willberg et al. | |
| 2009/0032252 A1 | 2/2009 | Boney et al. | |
| 2009/0037112 A1 | 2/2009 | Soliman et al. | |
| 2009/0065253 A1 | 3/2009 | Suarez-Rivera et al. | |

FOREIGN PATENT DOCUMENTS

| | | |
|---|---|---|
| EP | 0357317 A | 3/1990 |
| EP | 0435430 A1 | 7/1991 |
| EP | 1980604 A | 10/2008 |
| GB | 2288694 A | 10/1995 |
| WO | WO 99/05394 A | 2/1999 |
| WO | WO 2004/076815 A | 9/2004 |
| WO | WO 2006/002325 A2 | 1/2006 |
| WO | WO 2008/064074 | 5/2008 |
| WO | WO 2008/122114 | 10/2008 |
| WO | WO 2008/156970 | 12/2008 |

OTHER PUBLICATIONS

PCT/US2009/053304—Search Report, Mar. 11, 2009.
PCT/US2009/042137—Search Report, Aug. 21, 2009.
PCT/US2009/042421—Search Report, Sep. 14, 2009.
PCT/US2009/054536—Search Report, Nov. 18, 2009.
PCT/US2009/049844—Search Report, Dec. 17. 2009.
PCT/US2010/030013—Search Report, Jun. 7, 2010.
PCT/US2010/036969—Search Report, Jul. 21, 2010.
PCT/US2010/038420—Search Report, Aug. 18, 2010.
PCT/US2010/042364—Search Report, Sep. 9, 2010.
Tester et al, The future of thermal energy: Impact of Enhanced Geothermal Systems (EGS) on the United States 21$^{st}$ Century: (Retrieved from the Internet, <URL: geothermal.intel.gov/publications/future_or_geothermal_energy.pdf>) 2006, 372 pgs.
Greatly Enhanced Detectability of Geothermal Tracers Through Laser-Induced Fluorescence, Peter E. Rose, et al, Oct. 30, 2002; 10 pages.
Kinetics of Fluorescein Decay and Its Application As a Geothermal Tracer; Michael Adams and Jon Davis; vol. 20, No. 1/2; pp. 53-66, 1991.
Biopolymers: overview of several properties and consequences on their applications; K. Van de Velde and P. Kiekens; Department of Textiles, Ghent University, Sep. 11, pp. 433-442.
Components on High Temperature Plugs: Progress Report on Polymers and Silicates; S. Bauer, D. Galbreath, J. Hamilton and A. Mansure; Geothermal Resources Council Transactions, vol. 28, Aug. 29-Sep. 1, 2004, pp. 145-152.

* cited by examiner

IN SITU DECOMPOSITION OF CARBONYLS AT HIGH TEMPERATURE FOR FIXING INCOMPLETE AND FAILED WELL SEALS

RELATED APPLICATIONS

This application claims the benefit of Provisional Application Nos. 61/251,513, filed Oct. 14, 2009, which is incorporated by reference in its entirety.

BACKGROUND

Subterranean geothermal, oil and gas, and water wells are frequently used to tap subterranean resources. Regardless of the well type, proper sealing of the well casing from the outside environment is important for safe and efficient function of the well. Incomplete or improper sealing can arise from initial incomplete formation or deterioration of the bond at the cement/casing interface or at the cement/rock interface. Such incomplete or improper sealing can result in costly and dangerous problems during active well use. For example, improperly or incomplete sealing of a subterranean petroleum well can lead to a lack of control for both production and injection into or out of a given formation. For instance, if the well is a petroleum injection well, the injection fluid can travel up the annulus and/or down the annulus and enter the formation at a point where it is not desired. In addition, production of unwanted water can occur along with desired oil and gas. This lack of a functioning annular seal can be very hard or impossible to remedy using conventional cement systems.

Currently available sealing techniques involve pumping Portland cement grouts into areas where the seal has been damaged or where leaking or fluid loss is occurring. One problem with this solution is that it typically requires that the cement left inside the casing be drilled back out, which can be a costly and time consuming operation. In addition, Portland cements may not be able to penetrate the small cracks in the existing cement and therefore not be able to completely fix the existing problem.

SUMMARY

Methods and systems relating to in situ decomposition of carbonyls at high temperature for fixing incomplete and failed well seals, are described. According to one embodiment, a method, comprises injecting a sealing agent into a subterranean well having sealing channels or voids in well casings. An alkaline-earth carbonate precipitate is formed from the decomposition of a carbonyl compound. The sealing agent includes the carbonyl compound and an alkaline-earth halide salt.

In another embodiment, a subterranean well is provided which can include a subterranean formation, a well casing, an annulus, and sealed channels and voids. The sealed channels and voids are sealed with an alkaline-earth carbonate precipitate

BRIEF DESCRIPTION OF THE DRAWINGS

The present invention will become more fully apparent from the following description and appended claims, taken in conjunction with the accompanying figures. Understanding that these figures merely depict exemplary embodiments of the present invention and they are, therefore, not to be considered limiting of its scope. It will be readily appreciated that the components of the present invention, as generally described and illustrated in the figures herein, could be arranged, sized, and designed in a wide variety of different configurations. Furthermore, these figures are idealized and do not represent all possible failure modes which may occur nor do all voids exhibit such uniformity. Nonetheless, the invention will be described and explained with additional specificity and detail through the use of the accompanying figures in which:

DETAILED DESCRIPTION

Figure 1:
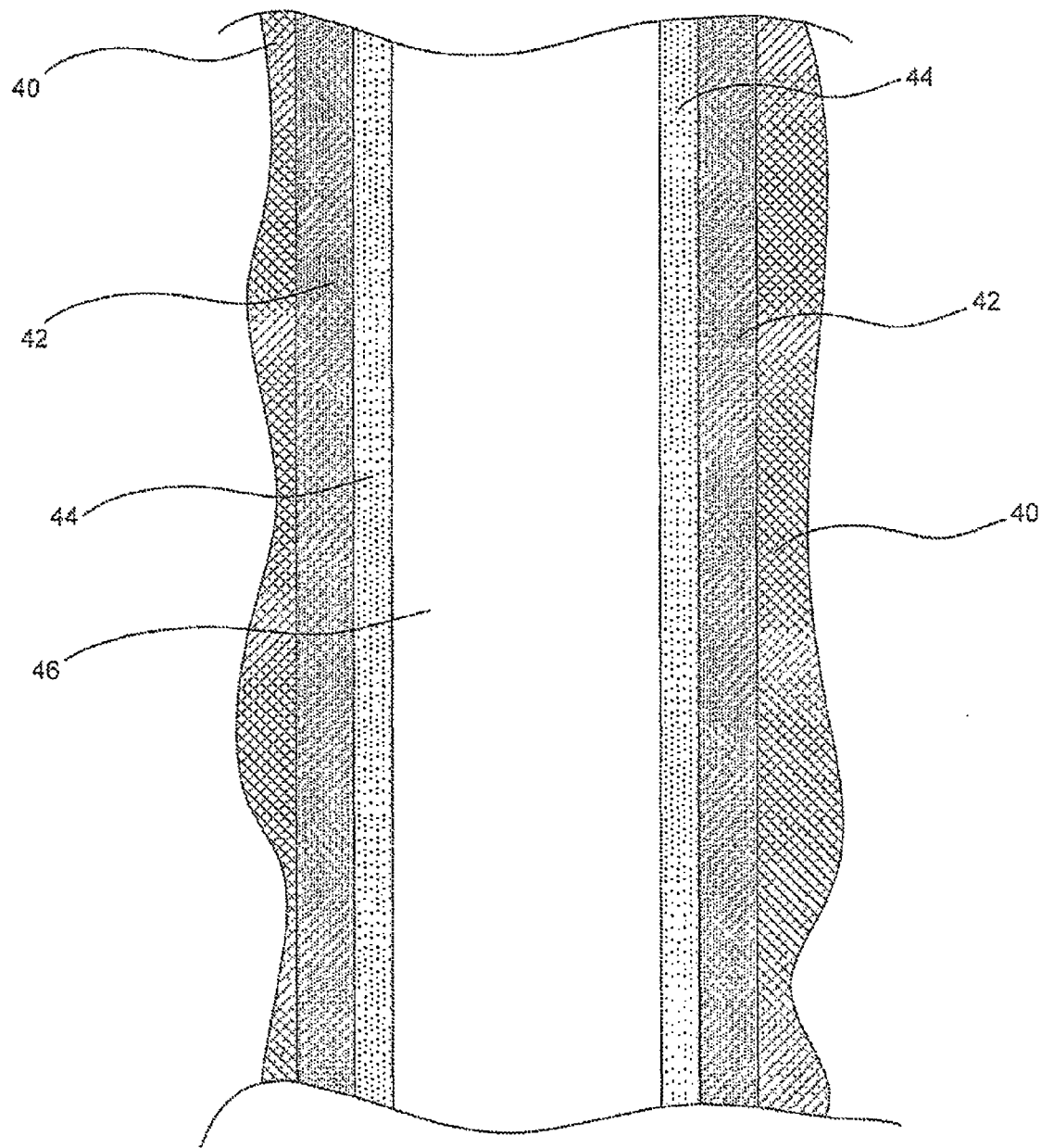
FIG. 1 is a cross-sectional schematic of a portion of an exemplary subterranean well, according to one embodiment.

Methods and systems relating to in situ decomposition of carbonyls at high temperature for fixing incomplete and failed well seals, are described. According to one embodiment, a method, comprises injecting a sealing agent into a subterranean well having sealing channels or voids in well casings. An alkaline-earth carbonate precipitate is formed from the decomposition of a carbonyl compound. The sealing agent includes the carbonyl compound and an alkaline-earth halide salt.

The following detailed description of exemplary embodiments of the invention makes reference to the accompanying figures, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following detailed description of the embodiments of the present invention is not intended to limit the scope of the invention, as claimed, but is presented for purposes of illustration only and not limited to describe the features and characteristics of the present invention, but to set forth the best mode of operation of the invention, and to sufficiently enable one skilled in the art to practice the invention. Accordingly, the scope of the present invention is to be defined solely by the appended claims.

DEFINITIONS

In describing and claiming the present embodiments, the following terminology will be used.

The singular forms "a," "an," and "the" include plural referents unless the context clearly dictates otherwise. Thus, for example, reference to "a compound" includes reference to one or more of such materials and reference to "injecting" refers to one or more such steps.

As used herein with respect to an identified property or circumstance, "substantially" refers to a degree of deviation that is sufficiently large so as to measurably detract from the identified property or circumstance. The exact degree of deviation allowable may in some cases depend on the specific context. For example, in one embodiment, "substantially" can be referred to greater than 0.5%. Thus, substantially no precipitation means that the flow is reduced by no greater than 0.5%.

As used herein, the term "subterranean well" and "subterranean well bore" are used interchangeably and refer to geothermal, petroleum (e.g. oil and gas), or water wells, including the adjacent subterranean formation. Such subterranean wells can be surface or subsea wells.

As used herein, "adjacent" refers to the proximity of two structures or elements. Particularly, elements that are identified as being "adjacent" may be either abutting or fluidly connected. Such elements may also be near or close to each other without necessarily contacting each other. The exact degree of proximity may in some cases depend on the specific context.

As used herein, the term "sealing agent" refers to a mixture of a carbonyl compound and an alkaline-earth halide salt. It is important to note that the sealing agent can also include other components such as a carrier fluid. In one aspect of the invention the sealing agent can include an aqueous carrier fluid into which the carbonyl compound and alkaline-earth halide salt are dissolved.

As used herein, "subterranean formation" can refer to any underground geologic structure including, but not limited to geothermal reservoirs, petroleum reservoirs, sequestering reservoirs, engineered geothermal systems, and the like. The subterranean formation can include or be adjacent to geothermal wells, petroleum wells, natural gas wells, and/or other man-made structures.

As used herein, a "lost circulation zone" refers to the loss of drilling mud to the formation during drilling operations or the loss of cement to the formation during cementing operations. Such zones can be recognized by missing returned drilling mud during drilling operations or by missing returned cement during cementing operations. The quantity of cement required for a casing cement job is calculated in advance of the operation. If cement returns are not observed after the calculated amount of cement has been injected then circulation loss is assumed to be the cause. Lost circulation refers to fluids being absent from desired circulation patterns either into or out of a formation or well annulus.

As used herein, the term "channel and/or void" refers to cracks, pockets, passages, pores, or other space through which a fluid can pass from one region or compartment of a subterranean well to another region or compartment of the well and/or surrounding formation. These channels and voids may, but not always, include trapped fluids such as drilling mud, water, gas, steam or other fluids.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such a range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

FIG. 1 shows an example of a cross-sectional view of a subterranean well. The purpose of the figure is to show a generalized view of the components of a subterranean well. Subterranean wells can be created in a variety of subterranean formations 40 including subsea formations, gas fields, oil fields, steam fields, geothermal formations, and the like. Subterranean wells can include one or more casing layers 44 which surround the production or injection passage 46 of the well. The casing layers can be formed of any suitable material. Most often the casing is formed of steel pipes having diameters ranging from 4.5 inches to about 20 inches. Non-limiting examples of suitable casing can include steel, metal alloy, polymer, cement and the like.

Further, the casing layer can be present in multiple stages or sections, depending on the well depth and surrounding conditions. Such casing strings can extend hundreds to thousands of feet into a formation. Most often, wells are formed by drilling a limited distance (e.g. several tens to several hundreds of feet) and then lining that portion with a casing section. Drilling is then continued followed by successive placement of casing sections such that the well is formed from the top down. Successively deeper casing stages are typically slightly smaller than an immediately preceding one to allow the casings to be slid through upper sections during installation. Interfaces between each section can be one source of circulation loss. This approach means that a gap initially exists between an outer surface of the casings and the surrounding formation.

Figure 2:
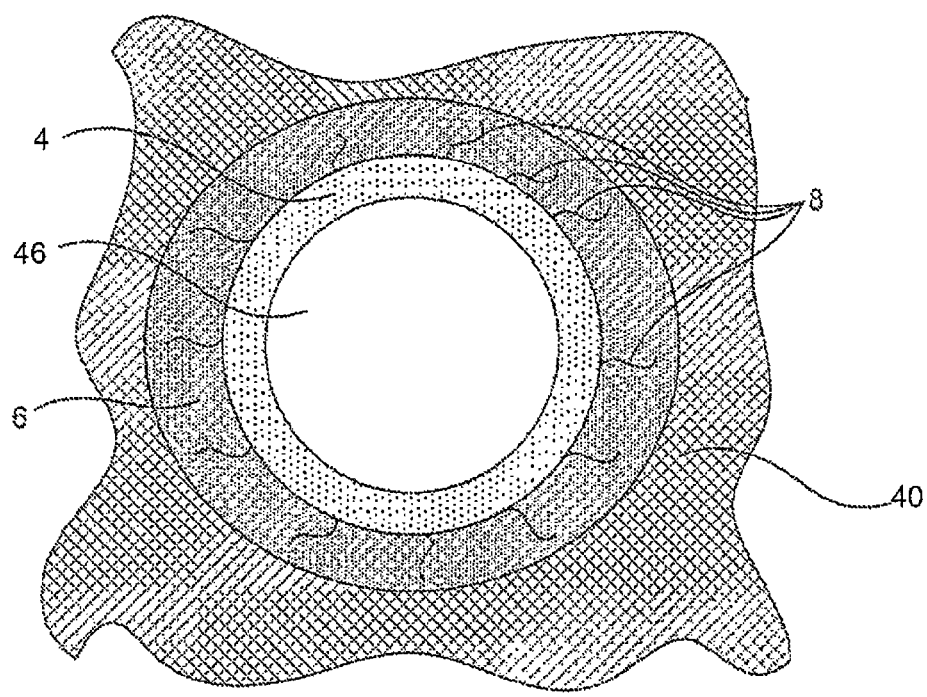
FIG. 2 is top cross-sectional view of an exemplary subterranean well with cracks in the cement surrounding the production/injection casing, according to one embodiment.

Subterranean wells may also include cement or grout layers 42 that fill at least a portion of the space between the subterranean formation 40 and the casing layer(s) 44. Channels and voids in subterranean wells, such as the one shown in FIG. 1, can occur when there are improper or incomplete sealing between one or more of the layers of the subterranean well. Furthermore, channels or voids can be formed over time as cracks form, wear or other failure mechanisms occur. For example, FIG. 2 shows a top-view of a subterranean well with channels and voids 8, in the form of cracks in the cement, present in the cement layer 6 of the well. In such a situation the cracks in the cement can result in the incomplete sealing of the subterranean well. In particular they can result in incomplete sealing between the subterranean formation and the well casing 4. In one embodiment, the disclosed methods can be used to seal channels and voids associated with cracking of the cement sheath surrounding the annulus of a subterranean well. Thus, the methods can be used as remedial steps to seal wells from losses along voids and/or channels. These voids and channels can act as a pathway for access to or egress from a well which circumvents a circulation path. Access or egress points can be found along interfaces between casing segments, punctures in casings, top surfaces at well heads, and the like.

Figure 3:
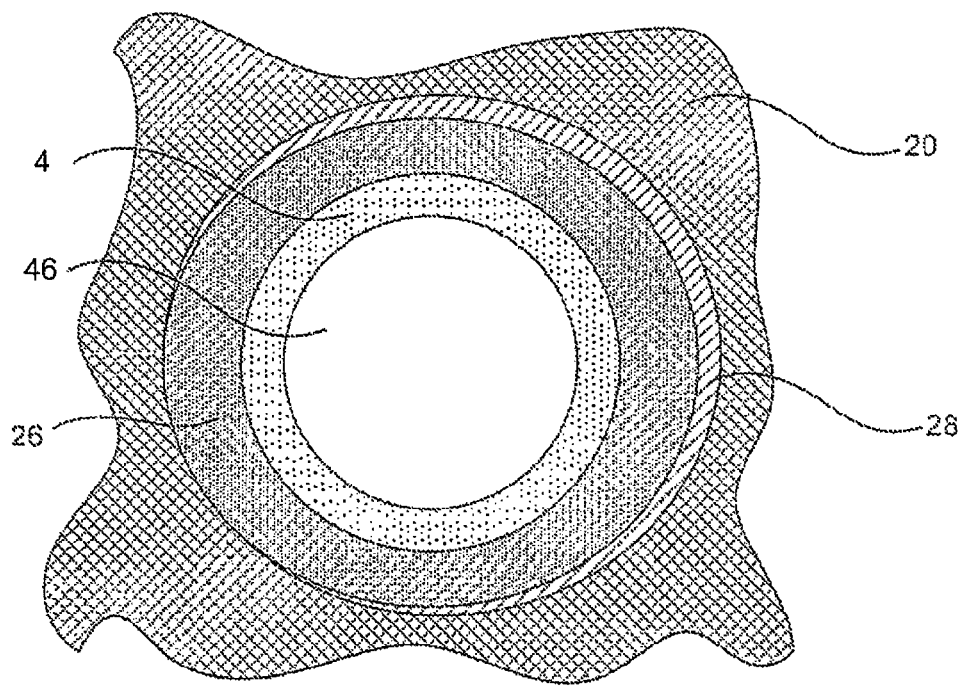
FIG. 3 is a top cross-sectional view of an exemplary subterranean well with a channel and/or void between the cementing layer and the subterranean formation, according to one embodiment.
Figure 4:
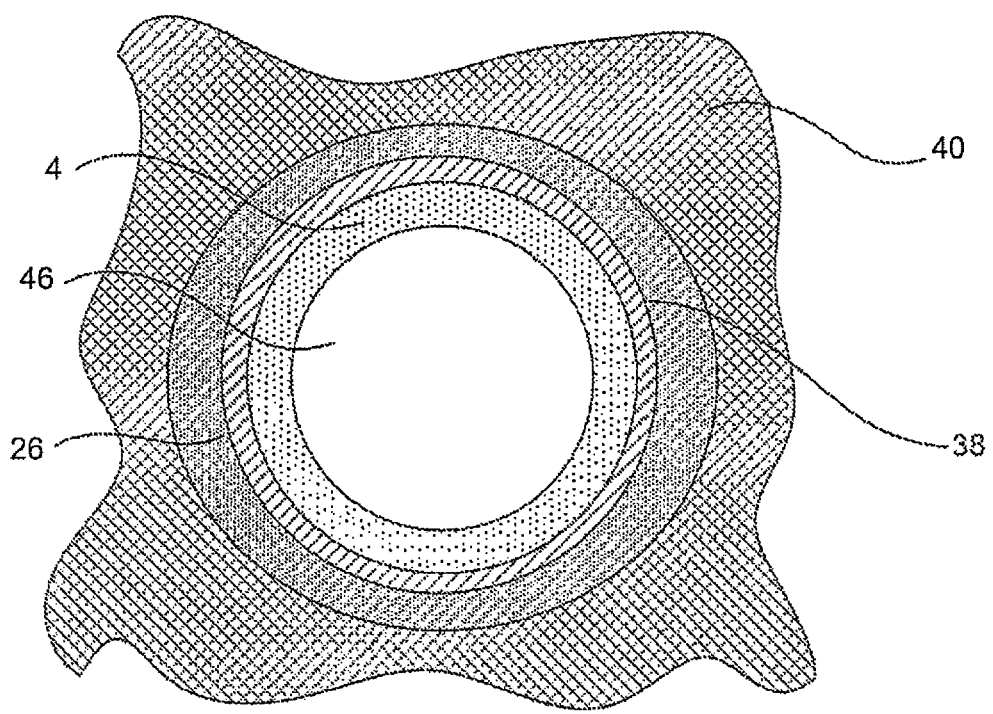
FIG. 4 is a top cross-sectional view of an exemplary subterranean well with a channel and/or void between the cementing layer and the production/injection casing, according to one embodiment.

Additional examples of subterranean wells having improper or incomplete sealing are shown in FIGS. 3 and 4. FIG. 3 shows a top-view of a subterranean well with a channel and/or void 28 between the cement layer 26 and the subterranean formation 20. Such channels and voids between the cement or grout layer and the subterranean formation can be associated with the debonding or deterioration of the cement layer or with the incomplete formation of the cement layer during the construction of the well. FIG. 4 shows a top-view of a subterranean well with a channel and/or void 38 between the wells casing and the cement layer. Like the uncemented annulus caused by undisplaced drilling fluid shown in FIG. 3, the uncemented annulus shown in FIG. 4 can be associated with incomplete displacement of the drilling fluid by the cement or grout during the construction of the well. Although the channel in FIG. 4 is shown as being substantially uniform around the case, the channel can be non-uniform.

Each of the channel types shown in FIGS. 2-4 are merely exemplary and should not be construed as being limiting of the types of channels that can be sealed. Other types of channels that can be sealed include those associated with leaks in annular seals and/or seals between layers of the well casings. Further, it is noteworthy that the channels targeted and sealed by the disclosed methods can be present throughout the entire subterranean well or can be targeted in select regions of the subterranean well. For example, in one embodiment, the channels can be present in a lost circulation zone. In one embodiment, the lost circulation zone can be completely isolated from the rest of the subterranean well using isolation devices such as open hole packers, bridge plugs, and the like.

With the above in mind, a method of sealing subterranean wells against fluid loss is provided. The method includes injecting a sealing agent into the subterranean well having channels therein. The injected sealing agent acts to form an alkaline-earth carbonate precipitate from decomposition of a carbonyl compound. The sealing agent can include a carbonyl compound and an alkaline-earth halide salt. The carbonate precipitate can act to seal fluid loss voids present in the subterranean well. In one aspect, the alkaline-earth carbonate precipitate can seal at least one fluid loss void in the subterranean well.

The carbonyl compound in the sealing agent degrades at elevated temperatures, e.g. above 135° C., and forms a carbonate in the presence of an alkaline earth halide salt. The carbonyl acts as a source of the carbonate anion for the formation of the carbonate while the alkaline-earth halide salt provides an alkaline-earth cation. In addition to forming at elevated temperatures, the alkaline-earth carbonate precipitate does not degrade with increases in temperature, thus allowing for its use in subterranean wells with very hot temperatures (e.g. from about 150° C. up to about 350° C. or greater).

The disclosed method can be used to treat and seal channels present in any type of subterranean well known in the field. For example, in one embodiment, the method can be used to seal fluid loss voids in a geothermal well. In another embodiment, the method can be used to seal channels and voids in a petroleum recovery or injection well. In yet another embodiment, the method can be used to seal channels and voids in a water well.

Although the exact conditions resulting in decomposition of the carbonyl and the formation of the alkaline-earth carbonate precipitate can vary depending on the sealing agent, the decomposition of the carbonyl compound typically occurs at an elevated temperature of about 150° C. (300° F.) or above. In one aspect, the decomposition can occur at temperatures of about 150° C. Generally, the elevated precipitation temperature can be from about 150° C. to about 350° C.

Thus, the subterranean well can be heated and/or cooled along selected regions in order to control areas where decomposition and deposition of the carbonate precipitate occur. In particular, cooler regions will yield reduced or substantially no precipitation of the carbonate in those target regions or fractures based on maintaining low temperatures. Cooling of the subterranean well or sections of the subterranean well can also be used in order to facilitate the flow of the sealing agent to channels and voids that may be more remote within the well. Thus, the method can optionally include cooling the subterranean well, or at least portions of the subterranean well, to a temperature sufficiently cool so as to prevent decomposition of the carbonyl at initial injection of the sealing agent.

This can also help to reduce precipitation plugging while leaving open voids trapped behind. As such, precipitation can occur initially further away from the casing and migrate inwards as the area is heated by intrinsic surrounding heat from the formation. Although many subterranean wells have sufficiently high temperatures to cause the decomposition of the carbonyl compound, in some aspects it may be desirable to heat the subterranean well, or portions of the subterranean well in order to facilitate the decomposition or more rapid decomposition of the carbonyl compound, thus facilitating the more rapid sealing of the channels and voids.

Due to the role of temperature in the decomposition of the carbonyl and the formation of the alkaline-earth carbonate precipitate, in some aspects it may be desirable to use temperature monitoring tools in order to enhance control and/or facilitate sealing of subterranean well channels and voids. Generally, any type of temperature monitoring equipment can be used including, but not limited to fiber optic tubes or cables. The monitoring of the temperature of a region before, during and after treatment with the sealing agent can also help in determining the extent and/or effectiveness of the treatment. For example, if one area of the subterranean well is cooler than the rest of the well, sealing of channels and voids in this region may be slower or less effective without additional heating.

The carbonyl-containing compound present in the sealing agent can generally be any carbonyl-containing compound or mixtures of carbonyl-containing compounds. In one embodiment, the carbonyl-containing compound can be urea, dimethyl carbonate, or mixtures thereof. In one aspect, non-limiting examples of alkaline-earth halide salts that can be used as a component of the sealing agent can include calcium chloride, magnesium chloride, calcium bromide, calcium iodide, magnesium bromide, magnesium iodide, or combinations of such materials. In one embodiment, the alkaline-earth halide can be calcium chloride.

Reaction I illustrates the basic reaction that occurs between the carbonyl compound and the alkaline-earth halide salt, and specifically shows the reaction between urea and calcium chloride.

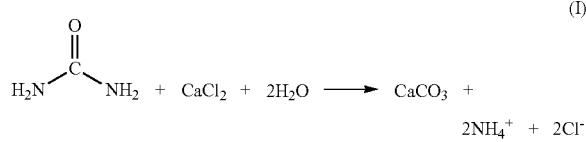

(I)

Similarly, Reaction II illustrates the reaction when the sealing agent includes dimethyl carbonate and calcium chloride.

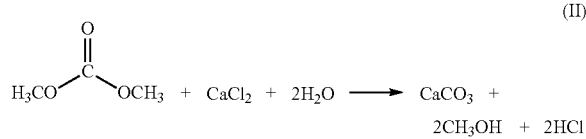

(II)

The carbonyl compound, such as the urea or dimethyl carbonate exemplified above, can be present in the sealing agent at a molar concentration of 0.01 M to about 100 M. In one embodiment, the carbonyl compound can be present in the diversion at a molar concentration of 0.1 M to 10 M. Similarly the alkaline earth halide salt can be present in the sealing agent at molar concentrations of 0.01 M to about 100 M, or from 0.1 M to 10 M. Depending on the particular application, the molar ratio of the carbonyl compound to the alkaline earth halide salt can range from 100:1 to 1:100. In one embodiment, the molar ratio of carbonyl compound to alkaline earth halide salt can be 10:1 to 1:10. In another embodiment, the carbonyl compound to alkaline earth halide salt molar ratio can be about 1:1. The sealing agents can be readily prepared as aqueous solutions prior to injection into the well. These sealing agents can be prepared using surface batch mixers or they can be prepared at off-site locations and transported to the site.

One advantage of the presently disclosed methods is that the sealing agent can be pumped into voids as a low viscosity water solution without particles. At typical operating temperatures the solution viscosity (dynamic) will be below 1 cp, in some cases below about 0.4 cps, and in other cases below about 0.28 cps. This low viscosity allows the sealing agent to penetrate into narrow and tight cracks and spaces that other sealing techniques often do not seal. In some embodiments, the sealing agent can even function to seal small fractures in the surrounding subterranean formation, reducing or eliminating permeability of the adjacent formation. During introduction of the sealing agent, a pressure can be maintained to force the sealing agent into the well and corresponding voids. Optional mechanisms can be used to focus treatment of lost circulation zones. However, as a general guideline, pressures from hydrostatic to about 5,000 psi can be used to force sealing agents into the voids.

The sealing agent can optionally include additional components and/or additives such as, but not limited to flow control additives, catalysts, nucleation enhancers, viscosity flow modifiers, fillers, and the like. In one aspect, a flow control additive can be used in order to control flow within the well bore. Examples of flow control additives that can be used include, but are not limited to inert particulates, clays, thermally stable polymers, and combinations thereof. In one aspect, a particulate calcium carbonate can be used as an effective flow control additive. When used, the particulate calcium carbonate can also function as a nucleation seed for enhancing the rate of precipitation of the carbonate precipitate.

Although the present methods do not typically require remedial clean up following the sealing of channels and voids, any necessary cleanup can be done with relative ease. For example, if any precipitate material is left in the well bore, the residual precipitate can be easily removed by circulating or flushing the well with water or other liquid or by starting active well production.

If the sealing agent inadvertently seals non-targeted areas or areas of the well that were intended to remain open, or if it is desirable for any reason to unseal any channels and voids sealed by the disclosed methods; the carbonate precipitate can be reduced or substantially removed by providing an acid solution sufficient to dissolve the carbonate precipitate. Although a wide variety of acids can be suitable, weak organic acids and/or those which exhibit reduced disposal and environmental hazards are particularly desired. Non-limiting examples of suitable acids can include hydrochloric acid, acetic acid, formic acid, citric acid, and oxalic acid. The chelating agents nitrilotriacetate (NTA), ethylenediamine tetraacetate (EDTA), diethylenetriamine pentaacetate (DTPA), and combinations thereof can also be used to remove the carbonate precipitate formed using the disclosed sealing agents.

The present methods can provide the ability to resume normal well operations, i.e. steam injection, oil/gas extraction, etc., with little to no waiting after treatment. Unlike other known methods, there is no need to allow time for drying or curing, resumption of normal operations can occur immediately after treatment. This allows for less downtime and can increase the overall production of the well. Additionally, the present methods can use simple pumping units and may not require specialized equipment such as costly drilling rigs or coiled tubing units, although such equipment can be used. Further, the precipitates formed are highly thermally stable and can be used at extreme temperatures.

As described above, the present methods can be used to create subterranean wells with sealed channels and voids. Accordingly, in one embodiment, a subterranean well is provided. The subterranean well can include a subterranean formation, a well casing, an annulus, and sealed channels and voids. The sealed channels and voids can be sealed with an alkaline-earth carbonate precipitate. In one embodiment, the subterranean well can be a geothermal injection well or a geothermal production well. In another embodiment, the subterranean well can be a petroleum production or petroleum injection well. Although specific performance of this approach can vary with the conditions and configuration of the well, typical sealing of channels and voids can range from about 10% to about 100% of the channels and voids, and most often from 75% to about 100%.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A method, comprising:
    injecting a sealing agent into a subterranean well having sealing channels or voids in well casings; and
    forming an alkaline-earth carbonate precipitate from decomposition of a carbonyl compound;
    wherein the sealing agent includes the carbonyl compound and an alkaline-earth halide salt.

2. The method of claim 1, wherein at least one of the channels or voids in the subterranean well is sealed by the alkaline-earth carbonate precipitate.

3. The method of claim 2, further comprising exposing the carbonate precipitate to an acid solution sufficient to unseal the channels or voids in the subterranean well.

4. The method of claim 3, wherein the acid solution comprises a member selected from the group consisting of hydrochloric acid, acetic acid, formic acid, citric acid, oxalic acid, nitrilotriacetic acid (NTA), ethylenediamine tetraacetic acid (EDTA), diethylenetriamine pentaacetic acid (DTPA), and combinations thereof.

5. The method of claim 3, wherein the acid solution comprises a member selected from the group consisting of the chelating agents nitrilotriacetate (NTA), ethylenediamine tetraacetate (EDTA); diethylenetriamine pentaacetate (DTPA), and combinations thereof.

6. The method of claim 1, wherein the carbonyl compound is urea.

7. The method of claim 1, wherein the carbonyl compound is dimethyl carbonate.

8. The method of claim 1, wherein the alkaline-earth halide salt is selected from the group consisting of calcium chloride, magnesium chloride, calcium bromide, calcium iodide, magnesium bromide, magnesium iodide, and combinations thereof.

9. The method of claim 1, wherein the alkaline-earth halide salt is calcium chloride.

10. The method of claim 1, wherein the carbonyl compound and the alkaline-earth halide salt are present in the sealing agent at molar concentrations of about 0.1 M to about 10M.

11. The method of claim 1, wherein the sealing agent has a carbonyl compound to alkaline-earth halide salt molar ratio about 10:1 to about 1:10.

12. The method of claim 1, wherein the channels or voids in the subterranean well are associated with leaks in an annular seal.

13. The method of claim 1, wherein the channels or voids in the subterranean well are associated with debonding between a cement sheath and the well casing of the subterranean well.

14. The method of claim 1, wherein the channels or voids in the subterranean well are associated with debonding between a cement sheath and a subterranean formation through which the subterranean well is drilled.

15. The method of claim 1, wherein the channels or voids in the subterranean well are associated with cracking of a cement sheath surrounding an annulus of the subterranean well.

16. The method of claim 1, wherein the decomposition occurs at a temperature of about 150° C. or more.

17. The method of claim 1, further comprising cooling portions of the subterranean well prior to injecting in order to substantially reduce precipitation of the carbonate precipitate in regions adjacent the cooled portions.

18. The method of claim 1, wherein the subterranean well is a geothermal well.

19. The method of claim 1, wherein the subterranean well is a petroleum recovery or injection well.

* * * * *